United States Patent
Nonoguchi et al.

(10) Patent No.: US 9,608,493 B2
(45) Date of Patent: Mar. 28, 2017

(54) ROTARY ELECTRIC MACHINE AND METHOD OF MANUFACTURING THE SAME

(75) Inventors: Hiromu Nonoguchi, Chiyoda-ku (JP); Kazuhisa Takashima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 554 days.

(21) Appl. No.: 13/643,668

(22) PCT Filed: Sep. 22, 2010

(86) PCT No.: PCT/JP2010/066360
§ 371 (c)(1),
(2), (4) Date: Oct. 26, 2012

(87) PCT Pub. No.: WO2012/039028
PCT Pub. Date: Mar. 29, 2012

(65) Prior Publication Data
US 2013/0043749 A1    Feb. 21, 2013

(51) Int. Cl.
*H02K 3/52* (2006.01)
*H02K 15/02* (2006.01)
(Continued)

(52) U.S. Cl.
CPC .......... *H02K 3/522* (2013.01); *H02K 15/022* (2013.01); *H02K 15/095* (2013.01); *H02K 1/148* (2013.01); *Y10T 29/49012* (2015.01)

(58) Field of Classification Search
CPC .............................. H02K 3/522; H02K 15/095
(Continued)

(56) References Cited

U.S. PATENT DOCUMENTS 6,630,766 B1 * 10/2003 Kirn ...................... H02K 1/148
  29/596
6,717,314 B2 * 4/2004 Horst .................... D06F 37/304
  310/156.01
(Continued)

FOREIGN PATENT DOCUMENTS

JP   2002-325385 A   8/2002
JP   2002-272051 A   9/2002
(Continued)

OTHER PUBLICATIONS

International Search Report for PCT/JP2010/066360 dated Dec. 14, 2010.
(Continued)

*Primary Examiner* — Burton Mullins
(74) *Attorney, Agent, or Firm* — Sughrue Mion, PLLC; Richard C. Turner

(57) ABSTRACT

In a rotary electric machine including a stator and a rotor, the stator includes: a connected core (1) composed of a plurality of cores in which a first core (1b) and a second core (1c) are paired to connect in a belt shape to be rounded into a substantially cylindrical shape by being folded at a core connecting portion (1d) so as to surround the rotor; a plurality of coils in which a first coil (3f) and a second coil (3g) are paired; and a crossover wire (3c) which connects the winding end (3b) of the first coil (3f) to the winding start (3d) of the second coil (3g). The crossover wire (3c) are arranged on the inner diameter side than the core connecting portion (1d).

1 Claim, 17 Drawing Sheets

(51) Int. Cl.
*H02K 15/095* (2006.01)
*H02K 1/14* (2006.01)

(58) Field of Classification Search
USPC .................................. 310/194, 216.009, 184
See application file for complete search history.

(56) References Cited

U.S. PATENT DOCUMENTS

| | | | |
|---|---|---|---|
| 6,858,964 B2 * | 2/2005 | Masumoto et al. ... | 310/216.001 |
| 7,595,577 B2 | 9/2009 | Niguchi et al. | |
| 7,683,516 B2 | 3/2010 | Ishigami et al. | |
| 8,400,041 B2 * | 3/2013 | Modi et al. .................. | 310/194 |
| 2002/0113517 A1 | 8/2002 | Takano | |
| 2005/0044692 A1 | 3/2005 | Takano et al. | |
| 2006/0279146 A1 | 12/2006 | Ishigami et al. | |
| 2008/0073995 A1 | 3/2008 | Niguchi et al. | |
| 2009/0251023 A1 * | 10/2009 | Nakano et al. .......... | 310/156.38 |
| 2011/0156512 A1 | 6/2011 | Shimomura et al. | |

FOREIGN PATENT DOCUMENTS

| | | |
|---|---|---|
| JP | 2002-354738 A | 12/2002 |
| JP | 2006-191703 A | 7/2006 |
| JP | 2006-333670 A | 12/2006 |
| JP | 2008-86064 A | 4/2008 |
| JP | 2009-033873 A | 12/2009 |
| JP | 2010-74889 A | 4/2010 |
| JP | 2010-172195 A | 8/2010 |
| WO | 2009/060600 A1 | 5/2009 |

OTHER PUBLICATIONS

Japanese Office Action issued May 7, 2014, in Japanese Patent Application No. 2012-534847.

* cited by examiner

ROTARY ELECTRIC MACHINE AND METHOD OF MANUFACTURING THE SAME

CROSS REFERENCE TO RELATED APPLICATIONS

This application is a National Stage of International Application No. PCT/JP2010/066360 filed Sep. 22, 2010, the contents of which are incorporated herein by reference in their entirety.

TECHNICAL FIELD

The present invention relates to a rotary electric machine that uses connected stator cores and a method of manufacturing the same and, more particularly, relates to a method of winding a stator coil in connected stator cores.

Incidentally, examples of rotary electric machines that apply to the present invention include motors and generators for vehicles, alternatively motors for electric power steering and the like.

BACKGROUND ART

In order to achieve reduction in size and cost of rotary electric machines, efforts toward minimizing the number of connection points at stator coil terminals and improving workability are made by continuously winding stator coils of the same phase in series around a plurality of connected stator cores.

In the case where stator coils (hereinafter, stator coil is also merely referred to as "coil") are continuously wound in series around connected stator cores (hereinafter, stator core is also merely referred to as "core"), processing of a "crossover wire" between the coils wound in series is required.

For example, Patent Document 1 (Japanese Unexamined Patent Publication No. 2006-333670) discloses that in a rotary electric machine including a stator and a rotor arranged in face-to-face relation to the stator via an air gap, the stator includes a stator core and multiphase stator coils incorporated in the stator core. The stator core is formed by connecting a plurality of split core pieces. Each of the stator coils is wound around a coil bobbin attached to the outer periphery of a tooth portion of a respective one of the core pieces, by a concentrated winding method; and around mutually adjacent tooth portions, the respective coils that have the same phase and mutually different in the winding direction are continuously wound. Further, a crossover wire that connects a first stator coil wound around a first tooth portion to a second stator coil wound around a second tooth portion, is located at a position further toward the central side in the axial direction of the coil bobbin than an end portion of the coil bobbin, inclusive of this end portion.

That is, Patent Document 1 discloses a structure in which the coil is wound around each of the split cores and the crossover wire is taken around between the wound coils.

Furthermore, Patent Document 2 (Japanese Unexamined Patent Publication No. 2002-354738) discloses that in a rotary electric machine which winds a coil around a coil bobbin attached to a core and has a connected stator in which a plurality of cores are connected in a belt shape, the coil bobbin includes a coil insertion groove for winding start, a coil insertion groove for winding end, and a central convex portion. Winding is started along the core side corresponding to the coil insertion groove for winding end; the winding end of a coil wound along the core side corresponding to the coil insertion groove for winding start is inserted into the coil insertion groove for winding end while being wound on the convex portion; and the wound coil is fixed.

Furthermore, other examples of a "conventional terminal processing method" of a coil wound around connected stator cores (hereinafter, also referred to as a "connected core") will be shown in FIG. 19 to FIG. 22.

FIG. 19 is a plan view of a relevant part showing a conventional winding method which continuously winds by connecting a coil wound around each of connected cores using a different connecting component.

In FIG. 19, reference numeral 1 denotes a connected core; 1b denotes a first stator core (hereinafter, also referred to as "first core"); 1c denotes a second stator core (hereinafter, also referred to as "second core"); 1d denotes a stator core connecting portion (connecting portion of the first core and the second core); 2 denotes a coil bobbin; 3f denotes a first stator coil (hereinafter, also referred to as "first coil") wound around the first core; 3g denotes a second coil (hereinafter, also referred to as "second coil") wound around the second core; 3a denotes the winding start of the first coil; 3b denotes the winding end of the first coil; 3d denotes the winding start of the second coil; 3e denotes the winding end of the second coil; and 100 denotes a different connecting component which connects the winding end 3b of the first coil to the winding start 3d of the second coil.

Incidentally, as shown in FIG. 19, the connected core 1 is one in which the first core 1b and the second core 1c are connected at the core connecting portion 1d. Furthermore, FIG. 19 shows a state where two cores of the first core and the second core are connected; however, in fact, a plurality of cores (for example, 12 cores) are continuously connected and a coil is wound around each of the connected cores to constitute an entire stator.

By the way, FIG. 19 shows a state where the coils are wound around the plurality of cores that are connected to be formed in a belt shape (flat shape); however, each core connected to be formed in the belt shape can be folded at the core connecting portion 1d.

Then, when the coil winding around the plurality of cores is completed, each connected core is folded at the core connecting portion 1d and the outer periphery of the entire stator becomes a round shape. (See FIG. 10 to be described later.)

This fact is similar to other drawings.

FIG. 20 is a plan view of a relevant part showing a conventional winding method in which coils are continuously wound using "hook pins each provided in parallel to the direction of core stacking thickness" on a core fixing jig (fixing jig as shown in FIG. 13 and FIG. 14 to be described later), the core fixing jig being for winding the coil around each core of connected cores.

That is, FIG. 20 shows an example of the case where hook pins 110 parallel to the direction of core thickness (direction perpendicular to the page space) are arranged in a standing condition on the core fixing jig and winding of a first coil and winding of a second coil are continuously performed by hooking a coil wire on the hook pins 110.

Incidentally, in FIG. 20, reference numeral 3c denotes a crossover wire between the winding end 3b of the first coil and the winding start 3d of the second coil; and the winding end 3b of the first coil and the winding start 3d of the second coil are continued by a single coil wire via the crossover wire 3c.

That is, a first coil 3f and a second coil 3g are continued by the single coil wire via the crossover wire 3c.

FIG. 21 a plan view of a relevant part showing a conventional winding method in which coils are continuously wound by using convex portions each provided on a coil bobbin.

FIG. 21 shows an example of the case where winding of a first coil 3f and winding of a second coil 3g are continuously performed by using hooking convex portions 2a each formed on a coil bobbin 2 without using the hook pins as shown in FIG. 20.

FIG. 22 is a plan view of a relevant part showing a conventional winding method in which coils are continuously wound by using protrusions each provided on a coil bobbin.

FIG. 22 shows an example of the case where winding of a first coil 3f and winding of a second coil 3g are continuously performed by providing hooking protrusions 2b each on a coil bobbin 2 without using the hook pins as shown in FIG. 20.

Patent Document 1: Japanese Unexamined Patent Publication No. 2006-333670

Patent Document 2: Japanese Unexamined Patent Publication No. 2002-354738

DISCLOSURE OF THE INVENTION

Problems to be Solved by the Invention

In the rotating electric machine disclosed in Patent Document 1, each core is split (that is, each core is not connected) and the crossover wire needs to be taken around between the coils wound around the each split core, so that workability during manufacturing becomes bad.

In the rotating electric machine disclosed in Patent Document 2, the coil bobbin with a complicated shape having the coil insertion grooves, the central convex portion, and the like for fixing the wound coil needs to be used.

Furthermore, in the case where coils are not continuously wound around connected cores by a single coil wire, the different connecting component is needed to continuously wind by connecting coils wound around each of the connected cores as shown in FIG. 19.

In addition, in the conventional method in which winding is continuously performed around the connected cores (the method shown in FIG. 20), the crossover wire between the coils is long and a space for placing the crossover wire is needed.

Further, in the conventional method in which winding of the stator coils are continuously performed using the coil bobbins (the methods shown in FIG. 21 and FIG. 22), the shape of the coil bobbin is complicated and the strength of the coil bobbin needs the strength that is not damaged by coil's tension during winding; and therefore, the manufacturing cost runs up.

The present invention has been made to solve the foregoing problem and an object of the present invention is to provide a rotary electric machine and a method of manufacturing the same, which are capable of easily continuously winding coils around connected cores without using a different connecting component and complicated shaped coil bobbins each formed with a convex portion or the like for hooking a coil wire during the coil winding and capable of reducing a space in which a crossover wire between coils is placed.

Means for Solving the Problems

According to the present invention, there is provided a rotary electric machine including a stator and a rotor arranged in face-to-face relation to the stator via an air gap. The stator includes: a connected core composed of a plurality of cores in which a first core and a second core adjacent to the first core are paired to connect in a belt shape to be rounded into a substantially cylindrical shape by being folded at a core connecting portion so as to surround the rotor; a plurality of coils in which a first coil whose coil wire is wound around the first core via a coil bobbin and a second coil whose coil wire is wound around the second core via a coil bobbin; and a crossover wire which connects the winding end of the first coil to the winding start of the second coil. The first coil, the second coil, and the crossover wire are formed of a single continuous coil wire in each of the plurality of coils, and the plurality of crossover wires are arranged on the inner diameter side of the core connecting portion serving as the folding center of the plurality of cores.

Furthermore, according to the present invention, there is provided a method of manufacturing a rotary electric machine including a stator and a rotor arranged in face-to-face relation to the stator via an air gap, the stator including a connected core, a plurality of coils, and a crossover wire. The method of manufacturing the rotary electric machine includes: forming the connected core by the plurality of cores in which a first core and a second core adjacent to the first core are paired to connect in a belt shape to be rounded into a substantially cylindrical shape by being folded at a core connecting portion so as to surround the rotor; forming the plurality of coils in which a first coil whose coil wire is wound around the first core via a coil bobbin and a second coil whose coil wire is wound around the second core via a coil bobbin; forming the crossover wire by a coil wire which connects the winding end of the first coil to the winding start of the second coil; forming the first coil, the second coil, and the crossover wire by a single continuous coil wire in each of the plurality of coils; and arranging the plurality of crossover wires on the inner diameter side of the core connecting portion serving as the folding center of the plurality of cores.

Advantageous Effect of the Invention

According to the present invention, a coil bobbin having a conventional complicated shape does not need to be used, winding of a coil can be continuously performed around connected cores, a space in which a crossover wire between coils is placed can be further reduced, and coil winding does not loosen even when the core is removed from a fixing jig after coil winding, whereby a rotary electric machine that is inexpensive and excellent in workability can be obtained.

DESCRIPTION OF REFERENCE NUMERALS

Figure 1:
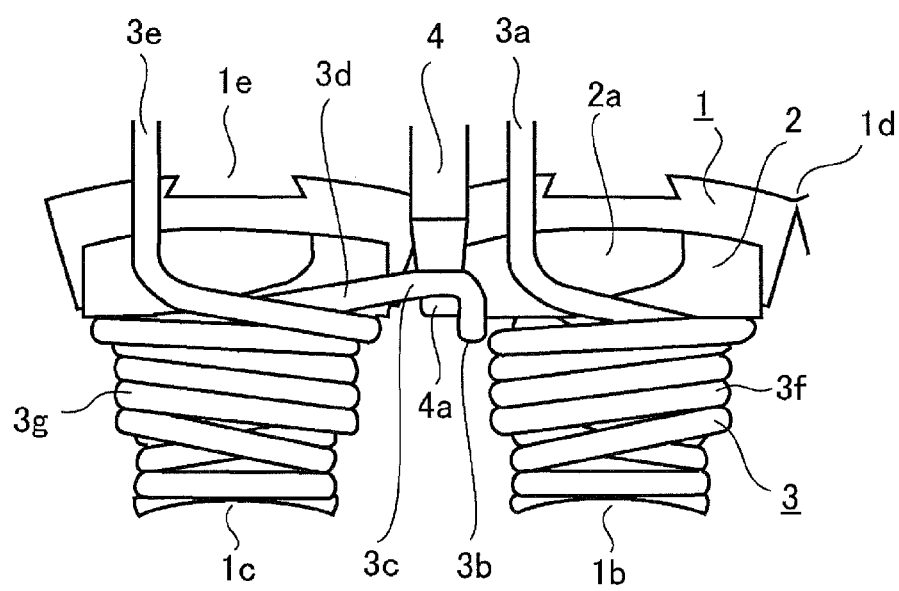
FIG. 1 is a plan view of a relevant part of a stator of a rotary electric machine according to Embodiment 1.

1 Connected stator core
1a Tooth portion
1b First core
1c Second core
1d Core connecting portion
1e Cutout portion
2 Coil bobbin
2a Convex portion
2b Protrusion
3 Stator coil
3a Winding start of first coil
3b Winding end of first coil
3c Crossover wire
3d Winding start of second coil
3e Winding end of second coil
3f First coil
3g Second coil
4 Hook pin
4a Hook portion
5 Core fixing jig
6 Rotor
7 Magnet
8 Entire stator
9 Slot
10 Different connecting component
11 Pin
12 Winding nozzle

MODE FOR CARRYING OUT THE INVENTION

Hereinafter, an embodiment example according to the present invention will be described with reference to drawings.

Incidentally, the same reference numerals as those in the respective drawings represent the same or corresponding elements.

Embodiment 1

FIG. 1 is a plan view of a relevant part of a stator of a rotary electric machine according to Embodiment 1 of the present invention.

Figure 2:
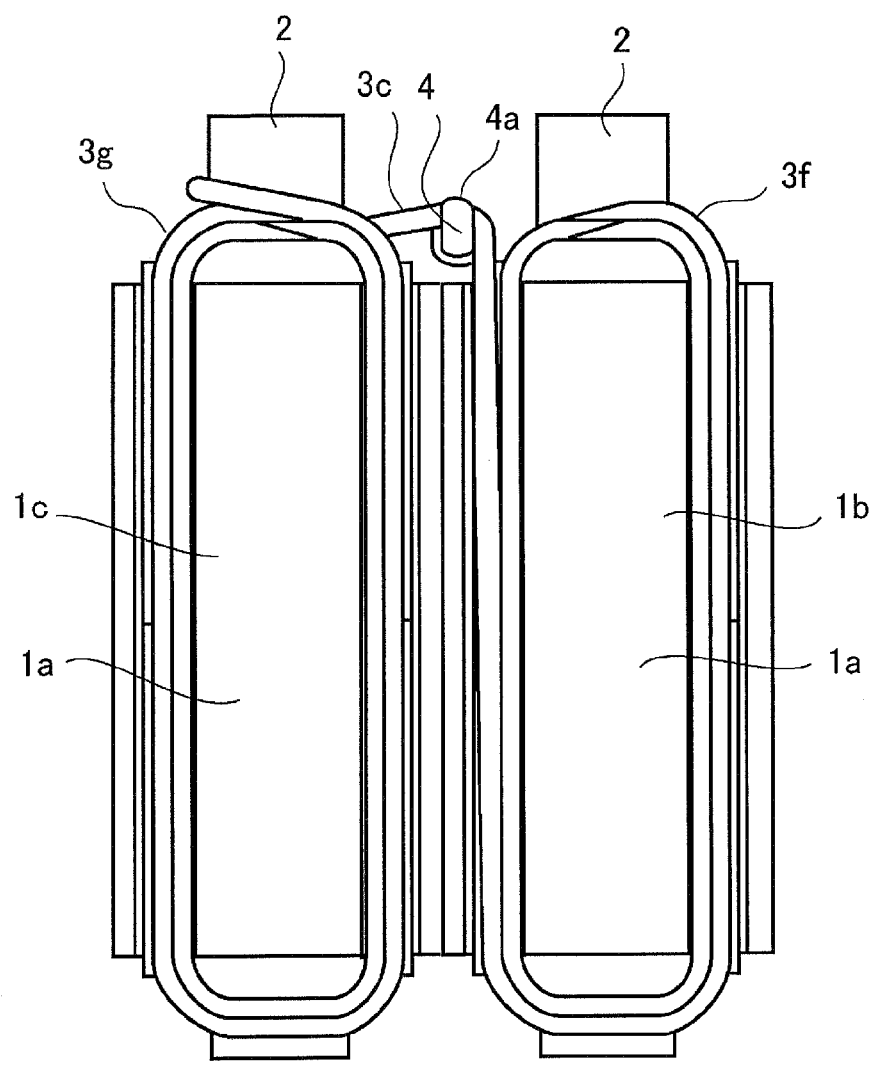
FIG. 2 is a front view of a relevant part of the stator of the rotary electric machine according to Embodiment 1.
Figure 3:
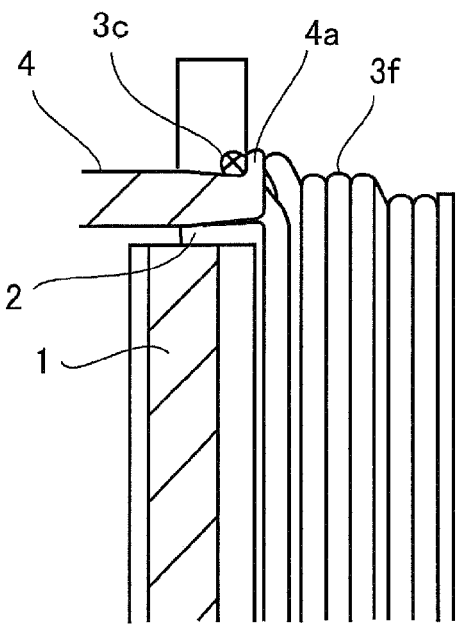
FIG. 3 is a sectional view of a relevant part of the stator of the rotary electric machine according to Embodiment 1.

Furthermore, FIG. 2 is a front view of a relevant part of the stator of the rotary electric machine according to Embodiment 1; and FIG. 3 is a sectional view of a relevant part of the stator of the rotary electric machine according to Embodiment 1.

Incidentally, FIG. 1 to FIG. 3 show a state during coil winding.

In FIG. 1 to FIG. 3, reference numeral 1 denotes a connected core (connected stator core); 1a denotes a tooth portion of the connected core; 1b denotes a first core; 1c denotes a second core; 1e denotes a cutout portion provided on an outer periphery portion of each connected core; 2 denotes a coil bobbin; 3 denotes a coil; 3a denotes the winding start of a first coil; 3b denotes the winding end of the first coil; 3c denotes a crossover wire; 3d denotes the winding start of a second coil; 3e denotes the winding end of the second coil; 3f denotes the first coil; 3g denotes the second coil; 4 denotes a hook pin provided on a fixing jig that fixes the core during coil winding; and 4a denotes a hook portion provided on an end portion of the hook pin.

Incidentally, in the drawings, the coil 3 includes the winding start 3a of the first coil, the winding end 3b of the second coil, the first coil 3f, the crossover wire 3c, the winding start 3d of the second coil, the winding end 3e of the second coil, and the second coil 3g.

Furthermore, FIG. 1 shows the connected core 1 in which two cores of the first core 1b and the second core 1c are paired to connect at a core connecting portion 1d; however, in fact, a plurality of two or more cores (for example, 12 cores) are continuously connected in a belt shape (flat shape).

"A method of continuously winding a coil around a connected core" according to the present embodiment will be described.

The first coil 3f is wound clockwise around the first core 1b when seen from the core inner diameter direction; next, the crossover wire 3c of the coil is hooked on "the hook pin 4 having the hook portion 4a at the end" provided on the core fixing jig side; and the second coil 3g is wound counterclockwise when seen from the core inner diameter direction, around the second core 1c that is arranged on the left side of the first core 1b when seen from the core inner diameter direction.

In the present embodiment, the crossover wire 3c of the coil is hooked on "the hook pin 4 having the hook portion 4a at the end" provided on the core fixing jig side to wind the coil around the core, which is to be described later; and accordingly, the hook portion does not need to be formed on the coil bobbin 2 as in the known art and thus the shape of the coil bobbin can be more simplified.

Furthermore, in this embodiment, the hook pin 4 can be made of a material higher in rigidity than the coil bobbin 2; and therefore, the hook pin 4 can be formed thinner and thus the length of the crossover wire 3c can be shortened.

The length of the crossover wire 3c can be shortened; and accordingly, the crossover wire can be placed well inside the stator, an increase in resistance value of the coil wire can be suppressed, and the rotary electric machine can also be improved in performance.

Figure 4:
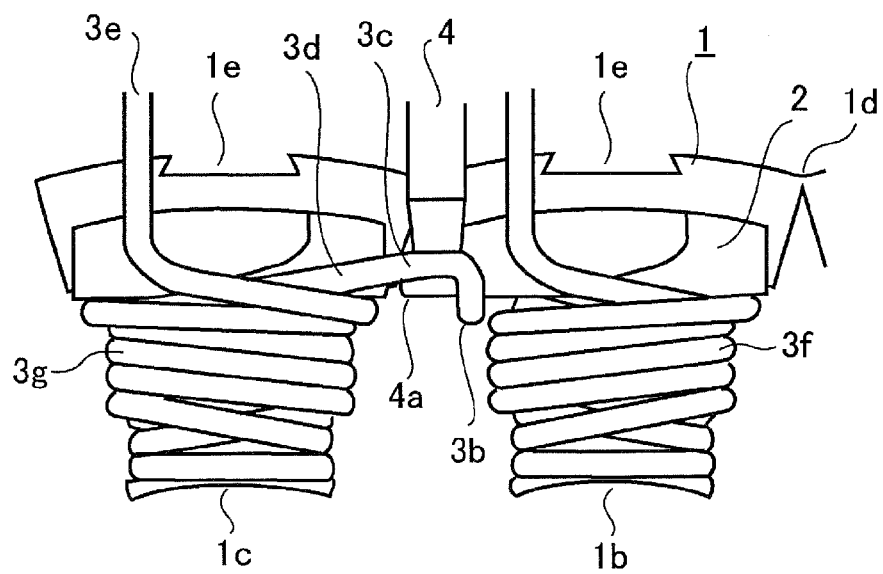
FIG. 4 is a plan view of a relevant part of the case where a hook pin is rotated in order to remove cores.
Figure 5:
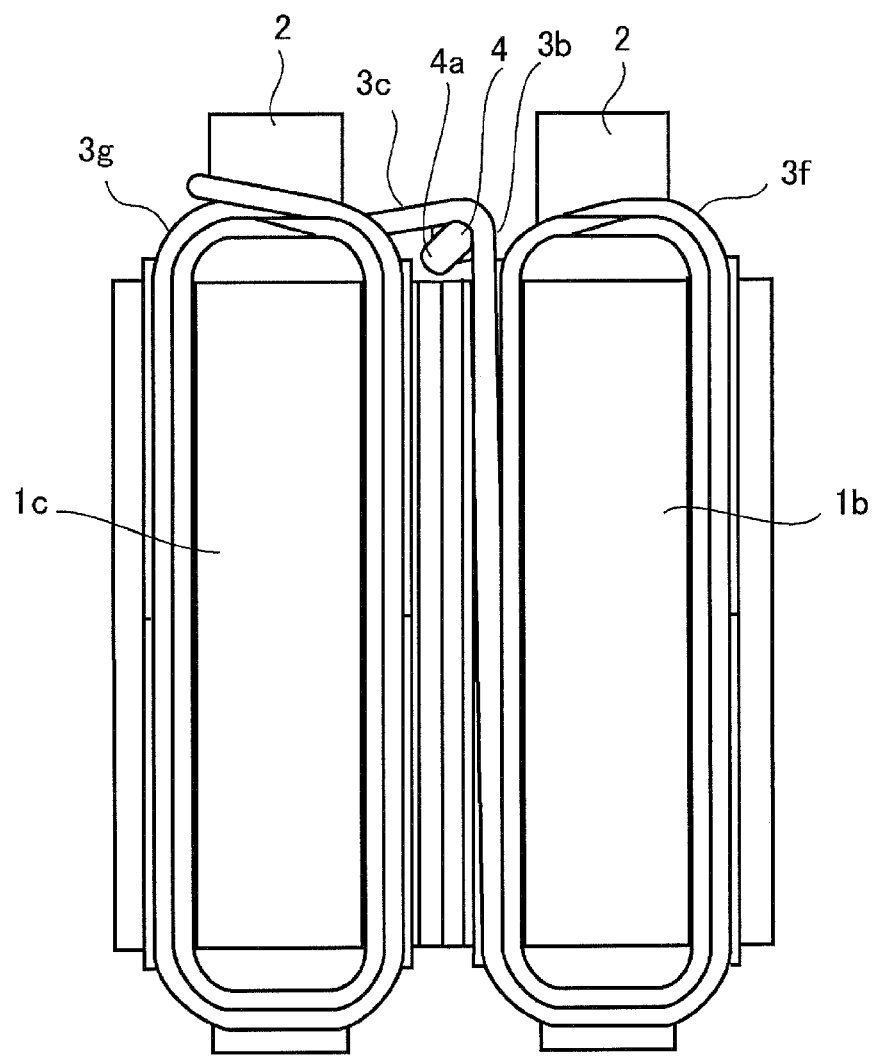
FIG. 5 is a front view of a relevant part of the case where the hook pin is rotated in order to remove cores.
Figure 6:
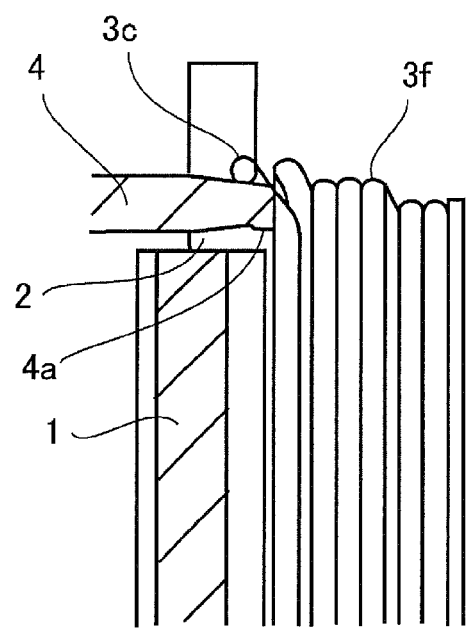
FIG. 6 is a sectional view of a relevant part of the case where the hook pin is rotated in order to remove cores.

Next, FIG. 4 is a plan view of a relevant part of the case where the hook pin is rotated in order to remove cores; FIG. 5 is a front view of the relevant part of the case where the hook pin is rotated in order to remove cores; and FIG. 6 is a sectional view of the relevant part of the case where the hook pin is rotated in order to remove cores.

Incidentally, as in FIG. 1, FIG. 4 shows the connected core 1 in which two cores of the first core 1b and the second core 1c are paired to connect at the core connecting portion 1d; however, in fact, a plurality of two or more cores are continuously connected in a belt shape.

When continuous winding work of the coil wire around each core of the belt shaped connected core 1 is completed, the belt-shaped connected core 1 around which the coil wire is wound is removed from the core fixing jig (not shown in the drawing) and the removed belt-shaped connected core needs to be rounded into a round shape in the outer periphery thereof in order to be used as the stator of the rotary electric machine.

In the present embodiment, as shown in FIG. 4 and FIG. 5, the hook pin 4 has a structure in which the hook portion 4a at the end is rotatable centering on the axis of the hook pin 4. Further, as shown in FIG. 6, the hook pin 4 has a taper shape that is smaller in diameter as approaching to the end.

The hook pin 4 has such structure; and accordingly, when continuous winding of the coil is completed, the hook portion 4a can be easily removed without getting stuck with the wound coil by rotating the hook portion 4a.

That is, according to the present embodiment, the belt-shaped connected core around which the coil is wound can be easily removed from the core fixing jig; and therefore, coil winding work can be efficiently performed.

Figure 7:
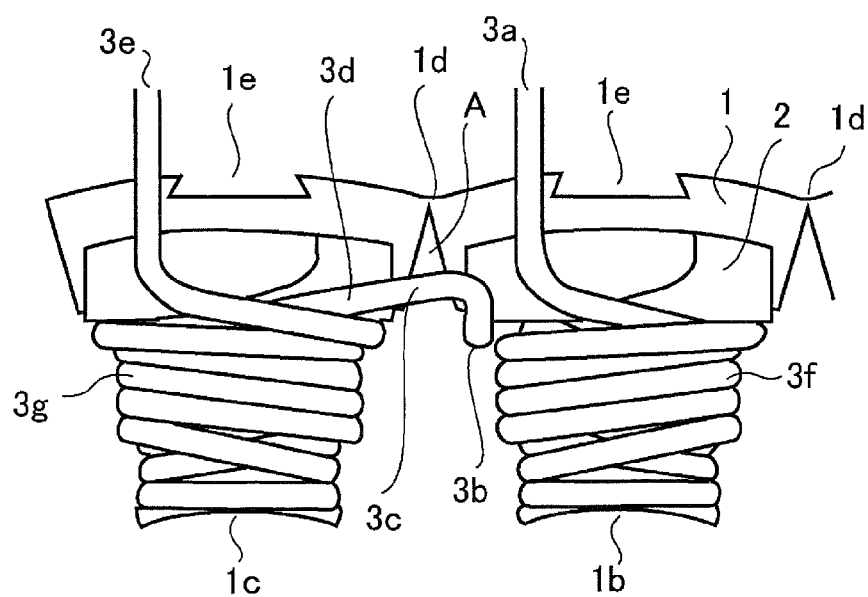
FIG. 7 is a plan view showing a relevant part of a connected core after winding.
Figure 8:
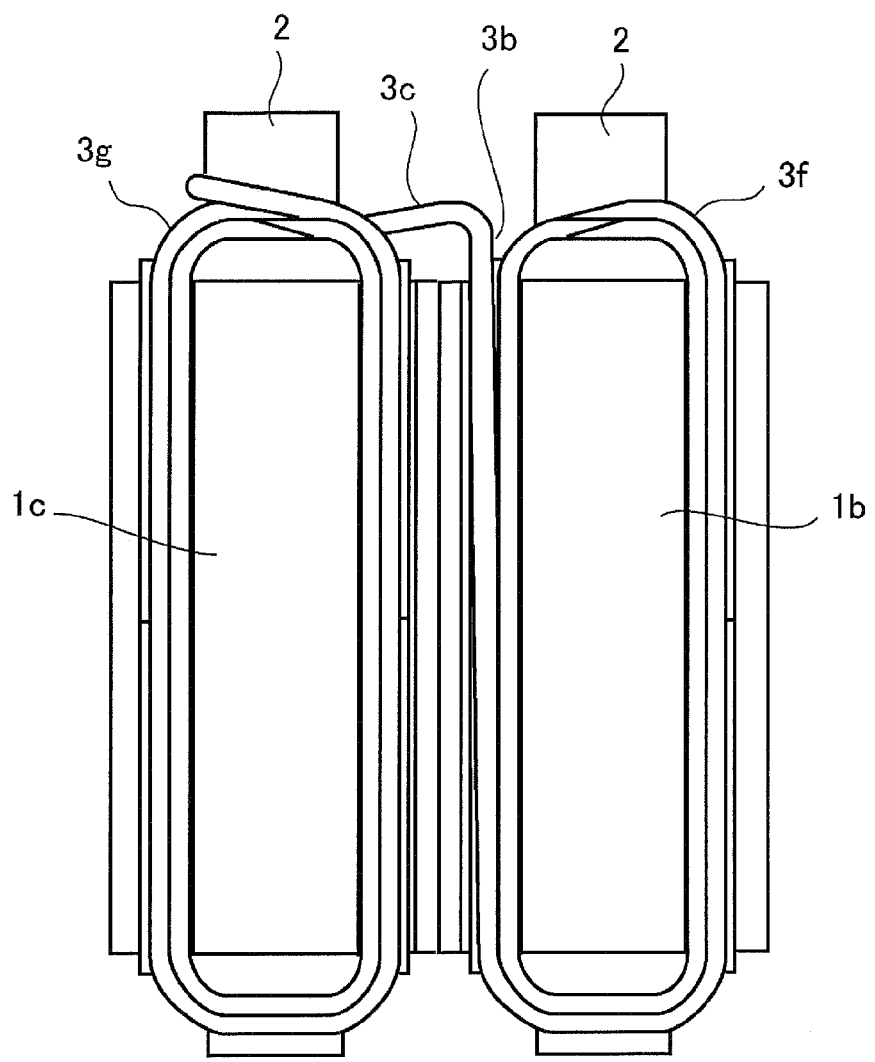
FIG. 8 is a front view showing the relevant part of the connected core after winding.
Figure 9:
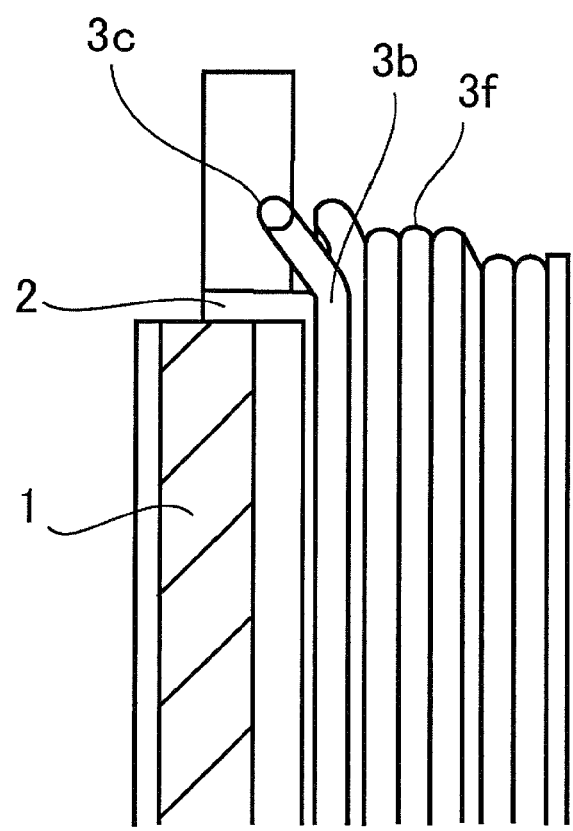
FIG. 9 is a sectional view showing the relevant part of the connected core after winding.

FIG. 7 is a plan view showing a relevant part of the connected core after coil winding; FIG. 8 is a front view showing a relevant part of the connected core after coil winding; and FIG. 9 is a sectional view showing a relevant part of the connected core after coil winding.

Incidentally, as in FIG. 1 and FIG. 4, FIG. 7 shows the connected core 1 in which two cores of the first core 1b and the second core 1c are paired to connect at the core connecting portion 1d; however, in fact, a plurality of two or more cores are continuously connected in a belt shape.

The winding start 3d of the second coil of the connected core removed from the core fixing jig after coil winding is fixed by winding a coil wire (for example, the winding end 3e of the second coil) on the upper layer of the second coil 3g as shown in FIG. 7; and therefore, the crossover wire 3c does not loosen.

Incidentally, FIG. 7 shows a state before folding the belt-shaped connected core at the core connecting portion 1d to be rounded; and a letter "A" denotes a space portion between the first core 1b and the second core 1c.

When the belt-shaped connected core 1 is folded at the core connecting portion 1d to be rounded, the belt-shaped connected core 1 becomes a substantially cylindrical shape to eliminate the space portion "A" and the outer periphery of the connected core 1 becomes a round shape.

Figure 10:
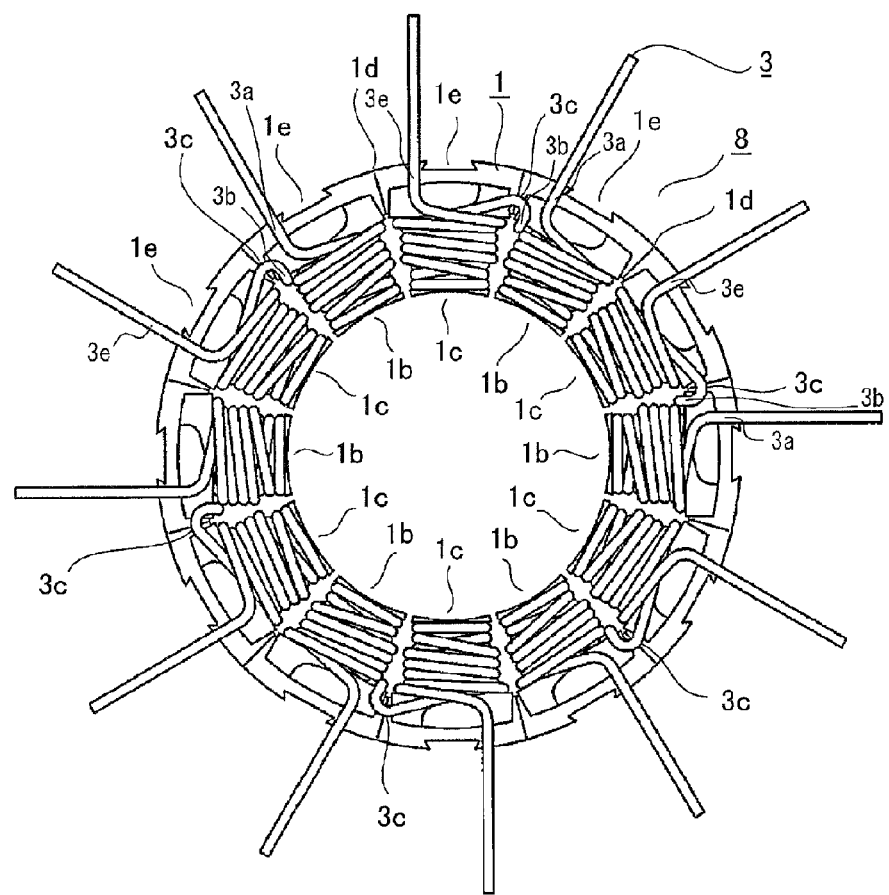
FIG. 10 is a plan view showing an entire stator after rounding.

FIG. 10 is a plan view conceptually showing an entire stator after being rounded by folding the connected core at the core connecting portion 1d.

The rounded connected core after removing from the core fixing jig is a substantially cylindrical shape and the central axis of the cylindrical shape substantially conforms to the rotational center axis of the rotor arranged in face-to-face relation to the stator.

As shown in FIG. 10, the stator according to the present embodiment includes: the connected core 1 composed of a plurality of cores (1b, 1c, 1b, 1c, . . . ) in which the first core 1b and the second core 1c adjacent to the first core 1b are paired to connect in a belt shape to be rounded into a cylindrical shape by being folded at the core connecting portion 1d so as to surround the rotor 6; a plurality of coils in which the first coil 3f whose coil wire is wound around the first core 1b via the coil bobbin 2 and the second coil 3g whose coil wire is wound around the second core 1c via the coil bobbin 2 of the connected core 1; and the crossover wire 3c which connects the winding end 3b of the first coil to the winding start 3d of the second coil.

Then, the first coil 3f, the second coil 3g, and the crossover wire 3c are formed of a single continuous coil wire in each of the plurality of coils; and the plurality of crossover wires 3c are arranged on the inner diameter side than the core connecting portion 1d serving as the folding center of the plurality of cores.

The crossover wire 3c is arranged on the inner diameter side than the core connecting portion 1d serving as the folding center of the connected core; and therefore, when the belt-shaped connected core is rounded as shown in FIG. 10, the crossover wire 3c is bent in a direction being small in curvature, tension is applied in a direction in which the winding end 3b of the first coil is pressed to the first core 1b, and the winding end 3b of the first coil does not loosen.

In this case, even when the arrangement of the first core 1b and the second core 1c and the winding direction of the first coil 3f and the second coil 3g are interchanged and, more specifically, even when the second core is arranged on the right side of the first core when seen from the core inner diameter direction and the first coil is wound counterclockwise and the second coil is wound clockwise when seen from the core inner diameter direction, similar effects can be obtained.

Incidentally, FIG. 10 shows a state where "the winding start 3a of the first coil wound around the first core 1b of the paired cores" and "the winding end 3e of the second coil wound around the second core 1c of the paired cores adjacent on the right side" are not connected; however, the coil may be wound around each "paired core" by a single coil wire, alternatively the coil may be wound around "all connected cores" by a single coil wire.

Figure 11:
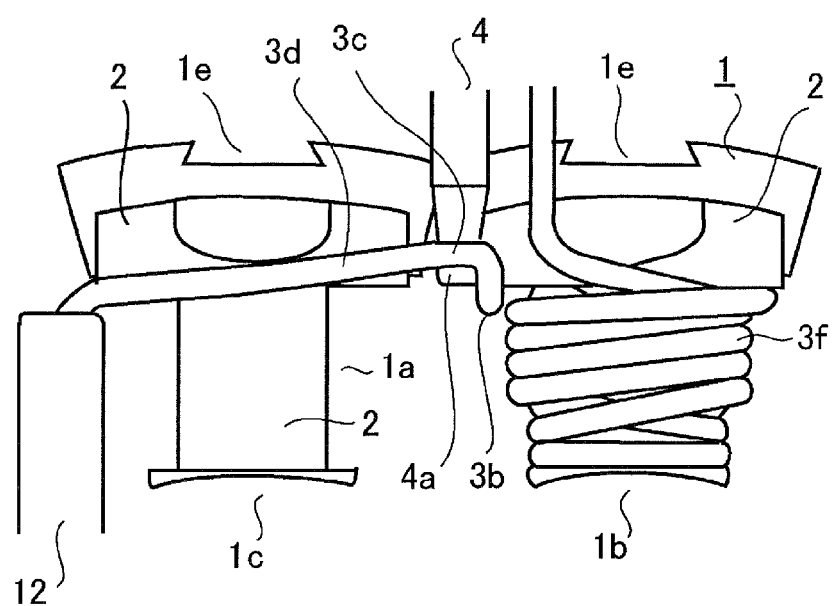
FIG. 11 is a plan view of a relevant part showing a state in the middle of hooking a coil by the hook pin.
Figure 12:
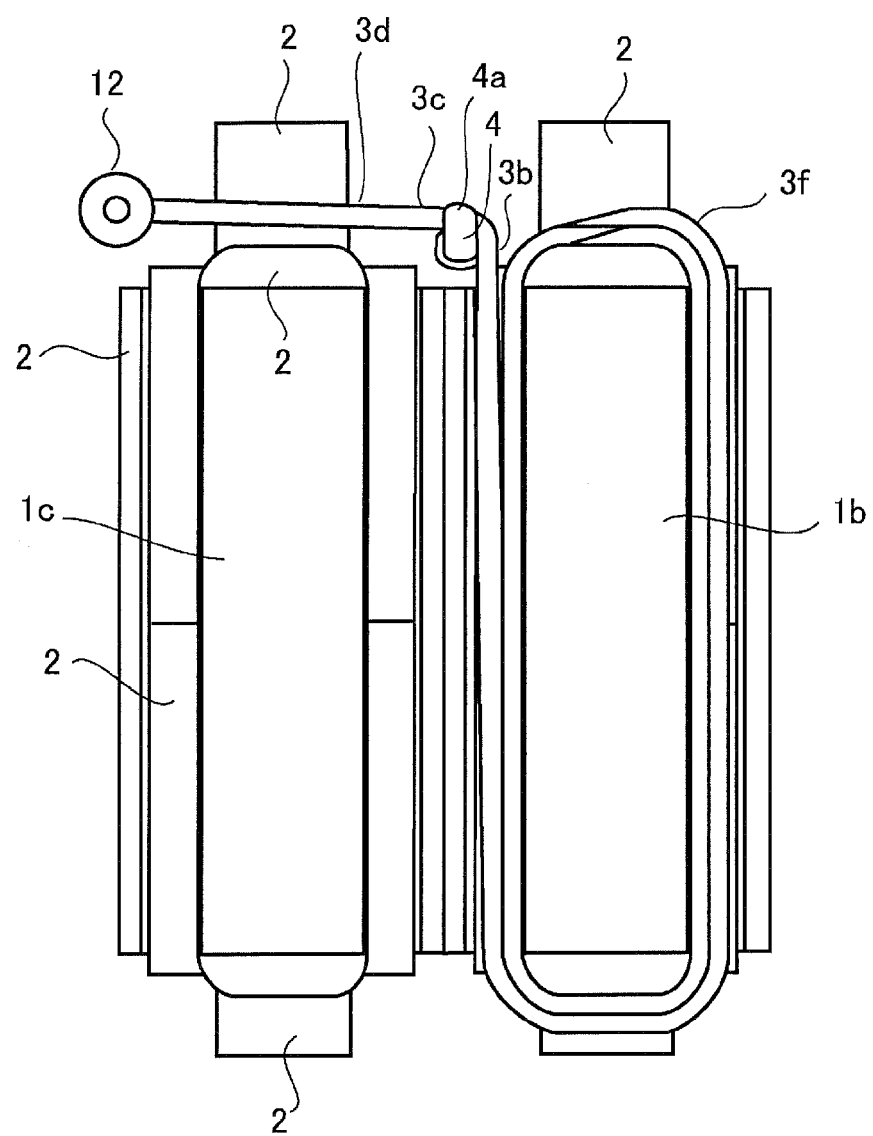
FIG. 12 is a front view of the relevant part showing a state in the middle of hooking the coil by the hook pin.

FIG. 11 is a plan view of a relevant part showing a state in the middle of hooking a coil by a hook pin; and FIG. 12 is a front view of a relevant part showing a state in the middle of hooking the coil by the hook pin.

In FIG. 11 and FIG. 12, a coil wire to be served as the coil is discharged from a winding nozzle 12 of a winding machine (not shown in the drawing), the discharged coil wire is first wound around the first core 1b via the coil bobbin 2 to be the first coil 3f; and then, the first coil 3f is wound around the second core 1c via the coil bobbin 2 to be the second coil 3g. In this case, the coil bobbin 2 is attached to the first core 1b and the second core 1c, respectively.

Incidentally, as described before, the winding end 3b of the first coil and the winding start 3d of the second coil are connected by the crossover wire 3c; and the first coil 3f, the crossover wire 3c, and the second coil 3g are configured by a single continuous coil wire. In this regard, however, the second coil 3g is before winding and therefore the second coil 3g is not shown in FIG. 11 and FIG. 12.

FIG. 11 and FIG. 12 show a state where a portion of the crossover wire 3c is hooked by the hook portion 4a of the hook pin 4.

Figure 13:
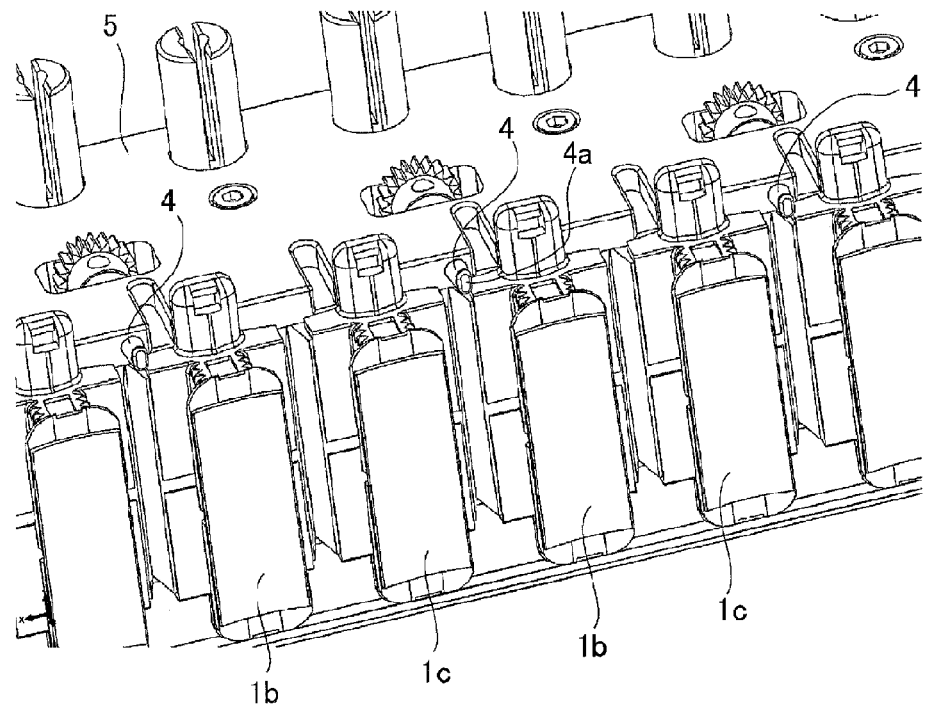
FIG. 13 is a perspective view showing a connected core in a state fixed to a core fixing jig.
Figure 14:
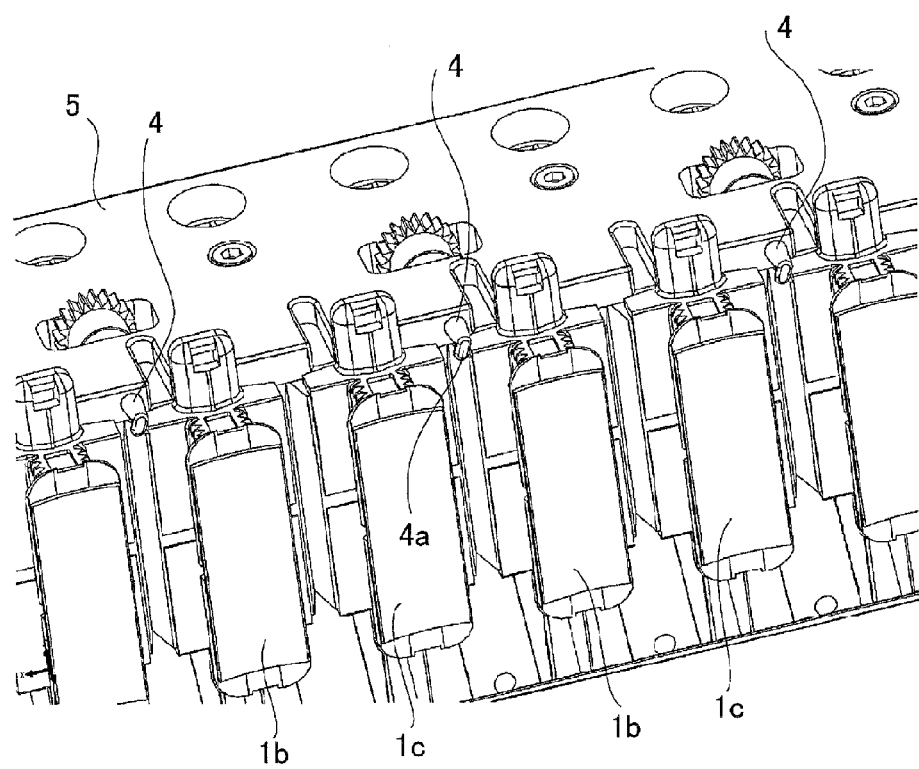
FIG. 14 is a perspective view showing the connected core in a state unfixed to the core fixing jig.

FIG. 13 is a perspective view showing a connected core in a state fixed to a core fixing jig; and FIG. 14 is a perspective view showing the connected core in a state unfixed to the core fixing jig.

FIG. 13 shows a state where the connected core in which a plurality of cores arranged in line in a belt shape are fixed to the core fixing jig 5 provided with rotatable hook pins 4.

In this state, a coil wire is continuously wound around the plurality of cores by a winding machine (not shown in the drawing).

Incidentally, when the connected core is fixed to the core fixing jig 5, the cutout portion 1e of the core shown in FIG. 1, FIG. 4, FIG. 7, and the like is used.

FIG. 14 is the perspective view showing the connected core in the state unfixed to the core fixing jig. FIG. 14 shows a state where the connected core around which the coil is wound is removed from the core fixing jig 5 provided with the hook pin 4.

FIG. 14 shows the state where the hook portion 4a of the hook pin 4 is rotated so as to easily remove the connected core around which the coil is wound.

The hook portion 4a does not get stuck with the coil wire wound around the core by rotating the hook portion 4a of the hook pin 4; and therefore, the connected core around which the coil is wound can be easily removed from the core fixing jig 5.

Figure 15:
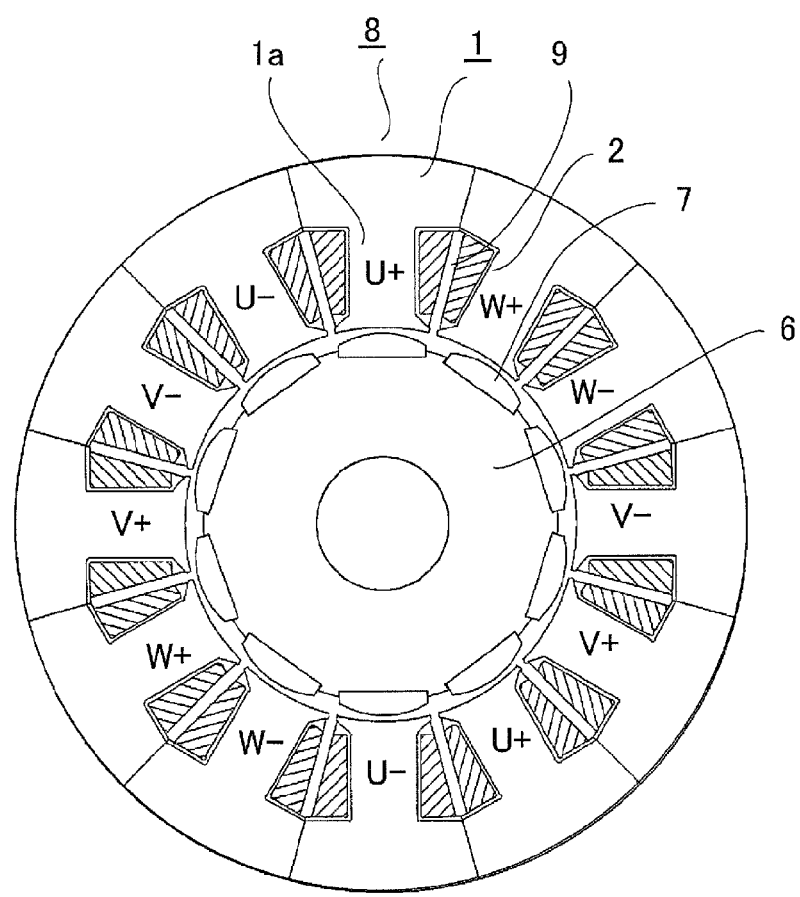
FIG. 15 is a sectional view of the stator of the rotary electric machine according to Embodiment 1.

FIG. 15 is a sectional view of a stator of the rotary electric machine according to Embodiment 1.

As shown in FIG. 15, the number of poles of a magnet 7 of the rotor 6 of the rotary electric machine according to the present embodiment is 10, and the number of slots 9 of an entire stator 8 is 12. Then, three phase coils are arranged in the order of U+, U−, V−, V+, W+, W−, U−, U+, V+, V−, W−, and W+. (+ and − represent that winding directions are different.)

Incidentally, in FIG. 15, hatched portions show coils and the slots 9 are provided in the core to place the coils.

Figure 16:
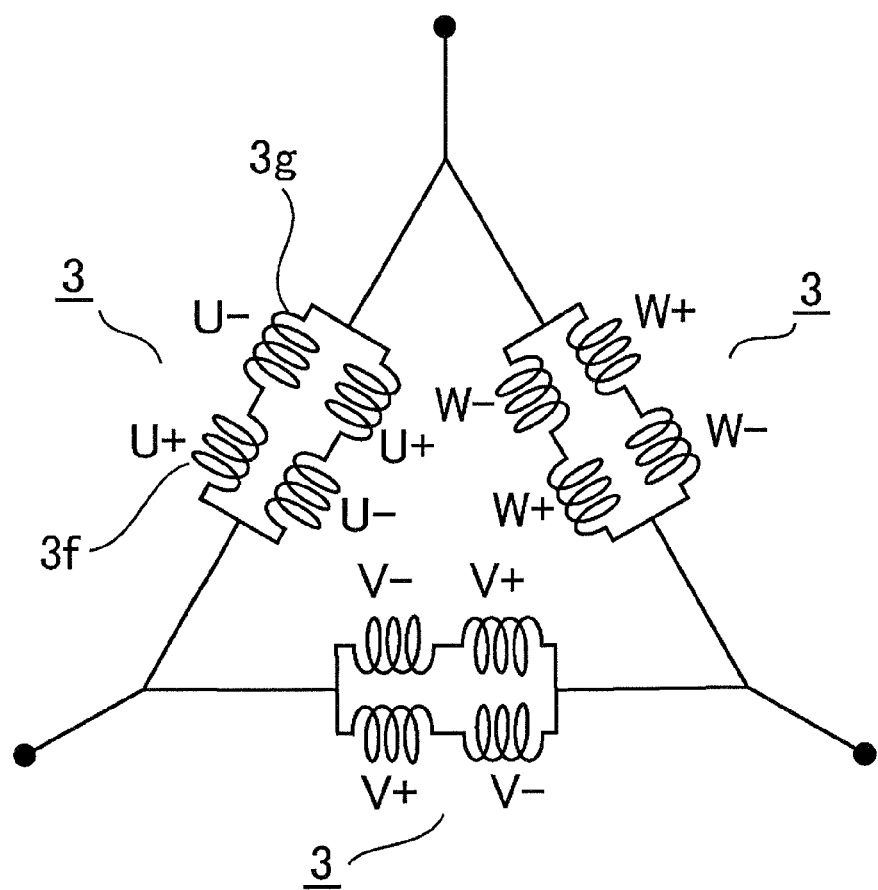
FIG. 16 is a connection diagram at the time when coils are connected in delta in the stator according to Embodiment 1.

FIG. 16 is a connection diagram at the time when coils are connected in delta in the stator according to Embodiment 1.

As shown in FIG. 16, a configuration is such that the coils are connected in delta and in two parallel groups of two coils in series each and the two coils in series are different in winding direction with each other.

Furthermore, the "two coils in series" mean that "two coils which are different in winding direction with each other and are connected in series (for example, U+, U−)."

This configuration is made by a system of 10 poles and 12 slots, and the winding method of the present embodiment is applied to the two coils in series. For example, U+ corresponds to the first coil 3f and U− corresponds to the second coil 3g.

Figure 17:
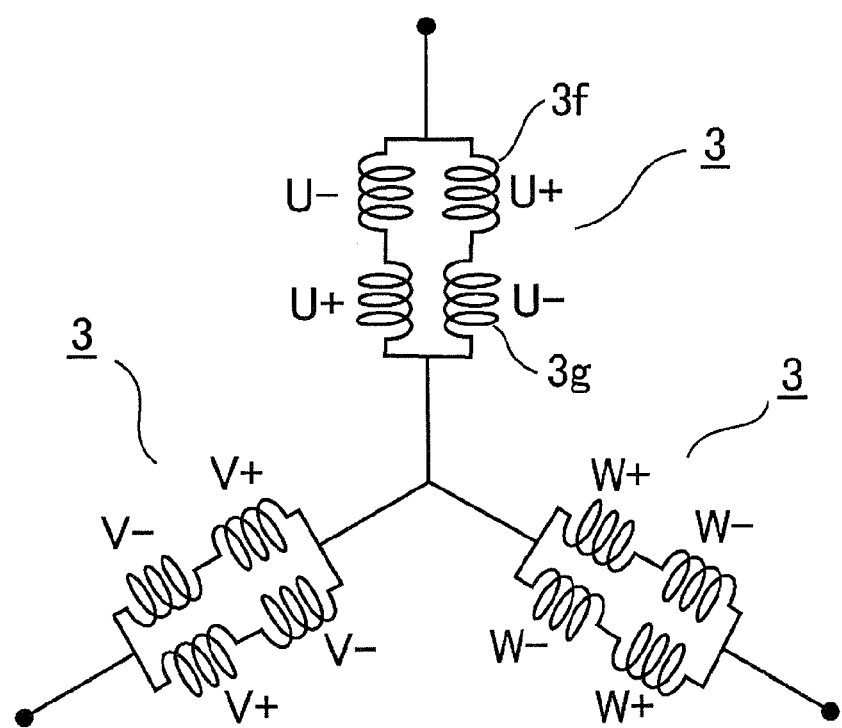
FIG. 17 is a connection diagram at the time when the coils are connected in star in the stator according to Embodiment 1.

In addition, FIG. 17 is a connection diagram at the time when coils are connected in star in the stator according to Embodiment 1.

As shown in FIG. 17, the coils may be connected in star and in two parallel groups of two coils in series each.

In this case, the reason why the combination of the number of poles and the number of slots is 10 poles and 12 slots is that the winding factor with respect to a fundamental wave is large and the winding factor with respect to harmonics is small.

That is, this shows that a torque ripple can be small while generating a large torque by the small number of magnets; and this leads to be able to supply a high-performance rotary electric machine inexpensively.

As described above, the rotary electric machine according to the present embodiment is the rotary electric machine including the stator and the rotor 6 arranged in face-to-face relation to the stator via an air gap.

The stator includes: the connected core 1 composed of a plurality of cores (1b, 1c, 1b, 1c, . . . ) in which the first core 1b and the second core 1c adjacent to the first core 1b are paired to connect in a belt shape to be rounded into a substantially cylindrical shape by being folded at the core connecting portion 1d so as to surround the rotor 6; a plurality of coils in which the first coil 3f whose coil wire is wound around the first core 1b via the coil bobbin 2 and the second coil 3g whose coil wire is wound around the second core 1c via the coil bobbin 2 of the connected core 1; and the crossover wire 3c which connects the winding end 3b of the first coil to the winding start 3d of the second coil.

The first coil 3f, the second coil 3g, and the crossover wire 3c are formed of a single continuous coil wire in each of the plurality of coils.

The plurality of crossover wires 3c are arranged on the inner diameter side than the core connecting portion 1d serving as the folding center of the plurality of cores.

According to the present embodiment, when the belt-shaped connected core is rounded into the cylindrical shape, the crossover wire 3c is arranged on the inner diameter side than the core connecting portion 1d serving as the folding center of the connected core 1; and therefore, the crossover wire 3c is bent in a direction being small in curvature, tension is applied in a direction in which the winding end 3b of the first coil is pressed to the first core 1b, and the winding end 3b of the first coil does not loosen.

Therefore, the winding end 3d of the first coil is wound to the winding start 3d of the second coil using the hook pin 4 and winding of the coil does not loosen even when the connected core around which the coil is wound is removed from the core fixing jig; and therefore, the rotary electric machine that is inexpensive and excellent in workability can be obtained.

Furthermore, the plurality of coils of the rotary electric machine according to the present embodiment are formed of the single continuous coil wire. Therefore, connection work of the plurality of coils is not needed and workability of the coil winding work can be considerably improved.

Further, the crossover wire 3c of the rotary electric machine according to the present embodiment is arranged on the outer diameter side of the plurality of coils rounded into a round shape and on the inner diameter side than the outer diameter of the plurality of coil bobbins rounded into a round shape.

In addition, the crossover wire 3c of the rotary electric machine according to the present embodiment is bent in the direction being small in curvature. Therefore, the tension is applied in the direction where the winding end of the first coil is pressed to the first core; and thus, even when the core around which the coil is wound is removed from the core fixing jig, the coil winding does not loosen.

Besides, in the rotary electric machine according to the present embodiment, the winding direction of the first coil 3f wound around the first core 1b is different from that of the second coil 3g wound around the second core 1c.

Furthermore, in the rotary electric machine according to the present embodiment, the second coil 3g is arranged on the left side of the first coil 3f when seen from the core inner diameter direction; the winding direction of the first coil 3f is clockwise when seen from the core inner diameter direction; and the winding direction of the second coil 3g is counterclockwise when seen from the inner diameter direction.

Further, in the rotary electric machine according to the present embodiment, the second coil 3g is arranged on the right side of the first coil 3f when seen from the core inner diameter direction; the winding direction of the first coil 3f is counterclockwise when seen from the core inner diameter direction; and the winding direction of the second coil 3g is clockwise when seen from the inner diameter direction.

In addition, in the rotary electric machine according to the present embodiment, the number of poles of the magnet of the rotor 6 is 10 and the number of slots provided on the stator is 12.

Besides, in the rotary electric machine according to the present embodiment, the plurality of coils are connected such that windings of the same phase are connected in two parallel groups of two coils in series each and respective phases are connected in delta or in star.

According to the present embodiment, the following specific effects are exhibited.

- The coils can be continuously wound around the connected core in which a plurality of cores are connected.
- The coils are continuously wound; and therefore, the connecting component can be reduced.
- The coils are continuously wound; and therefore, connection process can be reduced.
- The coil wire is hooked by the hook pin on the core fixing jig side; and therefore, the shape of the coil bobbin can be simplified.
- A thin shaped hook pin can be used; and therefore, the length of the crossover wire can be shortened and the amount of coils to be used can be reduced.
- After winding, even when the belt shaped connected core is rounded, the crossover wire does not protrude on the outer side than the outer diameter of the coil bobbin.
- After winding, even when the core is rounded, the coil does not loosen.
- A posture of the core does not need to be changed during winding and during hooking; and therefore, the total time of winding can be shortened.

Embodiment 2

Figure 18:
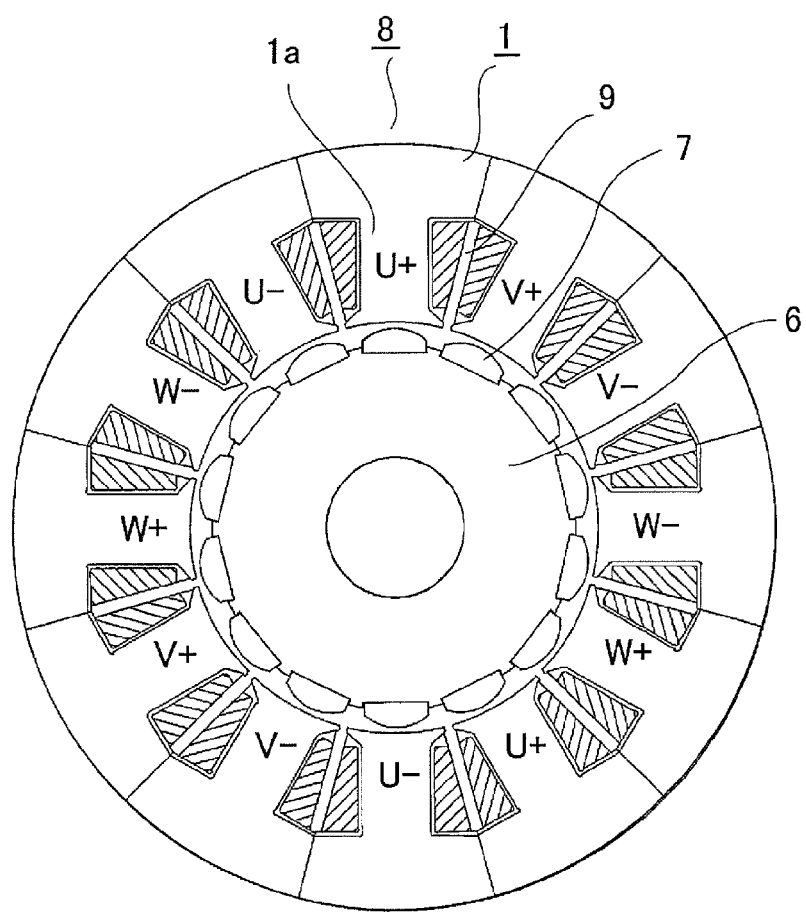
FIG. 18 is a sectional view of a stator of a rotary electric machine according to Embodiment 2.
Figure 19:
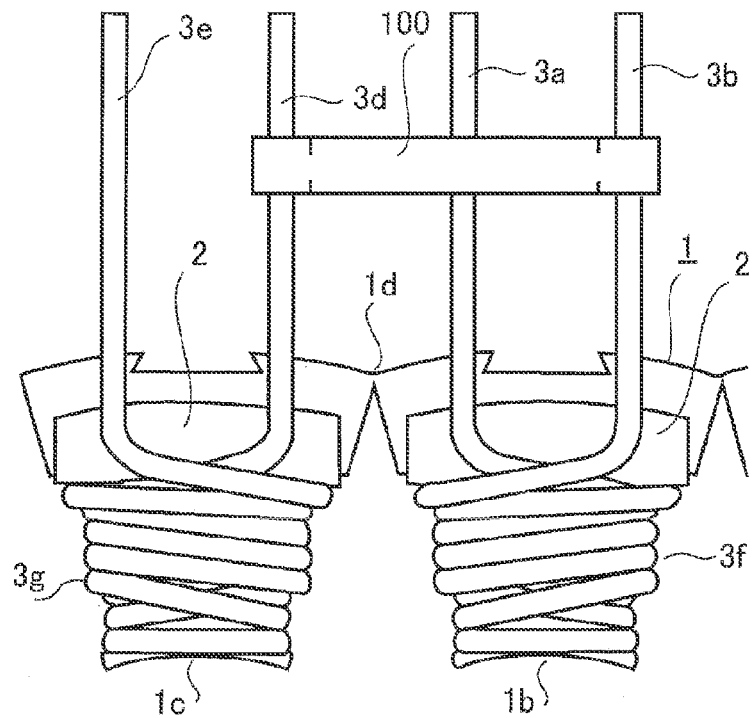
FIG. 19 is a plan view of a relevant part showing a conventional winding method in which coils are continuously wound using a connecting component.
Figure 20:
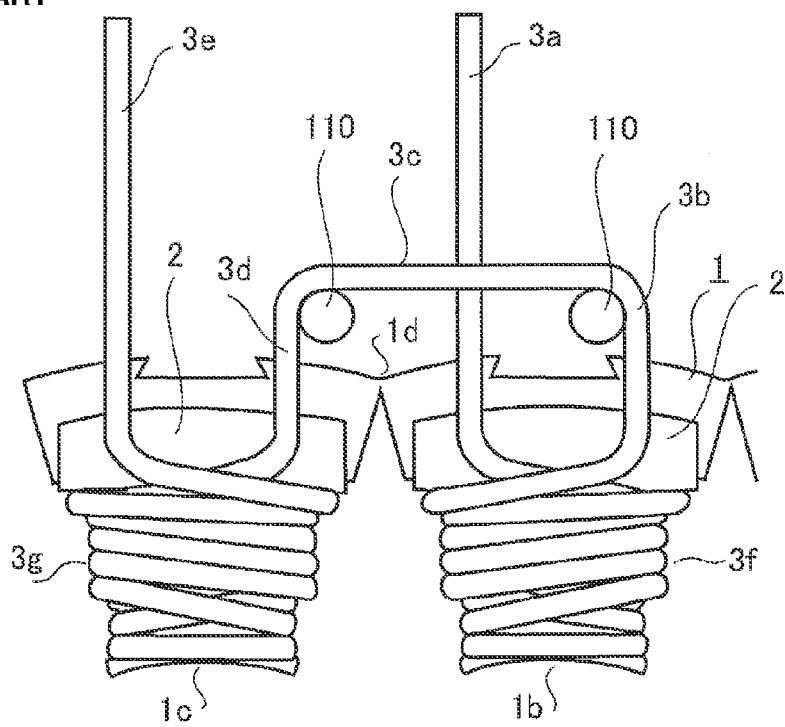
FIG. 20 is a plan view of a relevant part showing a conventional winding method in which coils are continuously wound using hook pins provided on a core fixing jig, the hook pins each being parallel to the direction of core stacking thickness.
Figure 21:
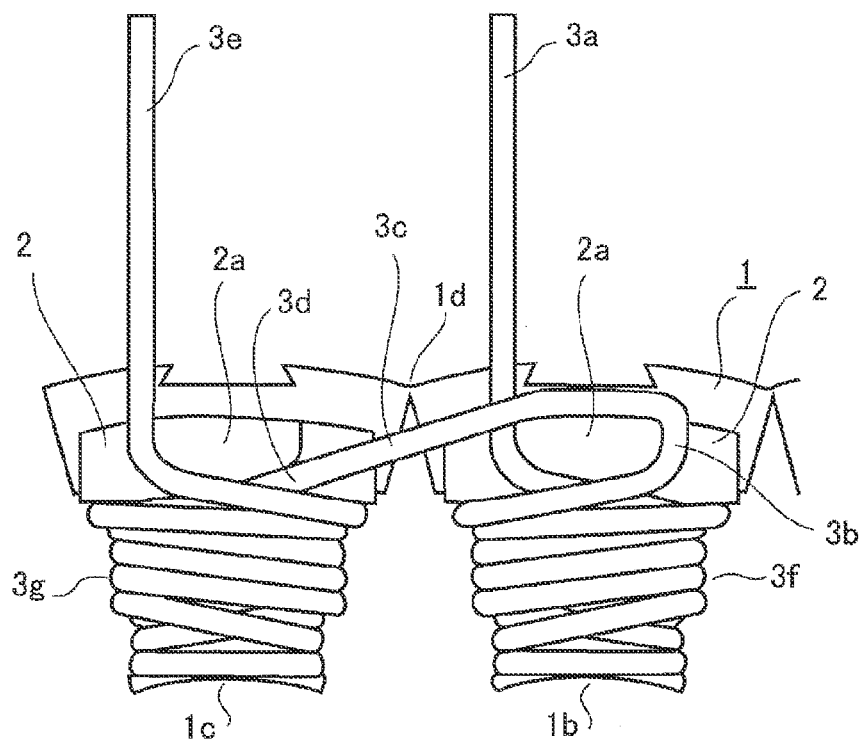
FIG. 21 is a plan view of a relevant part showing a conventional winding method in which coils are continuously wound using convex portions each provided on a coil bobbin.
Figure 22:
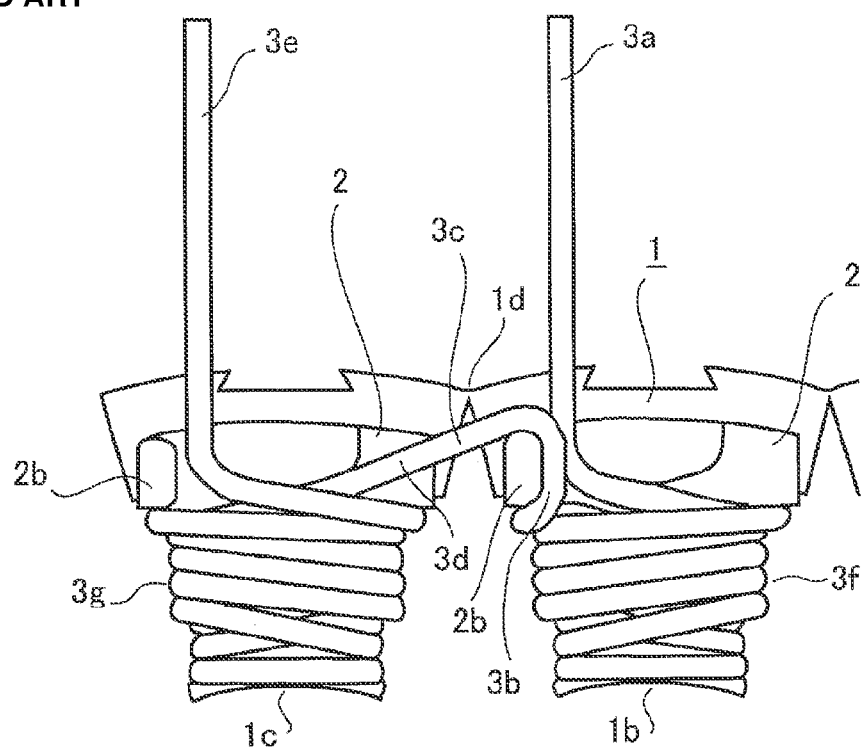
FIG. 22 is a plan view of a relevant part showing a conventional winding method in which coils are continuously wound using protrusions each provided on a coil bobbin.

In a rotary electric machine of Embodiment 2, as shown in FIG. 18, the number of poles of a magnet 7 of a rotor 6 is 14; the number of slots 9 of a stator core 8 is 12; and three phase coils are arranged in the order of U+, U−, V−, V+, W+, W−, U−, U+, V+, V−, W−, and W+. (+ and − represent that winding directions are different.)

The continuously arranged coils of the same phase are connected in series as in Embodiment 1 and are connected in two parallel groups of two coils in series each.

A configuration is also similar that the two coils in series are different in winding direction with each other. The configuration of other portions is similar to Embodiment 1.

In this case, the reason why the combination of the number of poles and the number of slots is 14 poles and 12 slots is that the winding factor with respect to a fundamental wave is large and the winding factor with respect to harmonics is small.

"The winding factor with respect to a fundamental wave is large and the winding factor with respect to harmonics is small" shows that a torque ripple can be small while generating a large torque by the small number of magnets; and this leads to be able to supply a high-performance rotary electric machine inexpensively.

As described above, in the rotary electric machine according to the present embodiment, the number of poles of the magnet of the rotor 6 is 14 and the number of slots provided on the stator is 12.

Furthermore, in the rotary electric machine according to the present embodiment, a plurality of coils are connected such that windings of the same phase are connected in two parallel groups of two coils in series each and respective phases are connected in delta or in star.

INDUSTRIAL APPLICABILITY

The present invention is useful for achieving "a rotary electric machine that is inexpensive and excellent in workability," which is capable of continuously winding a coil around a belt-shaped connected core and is capable of reducing a space that places a crossover wire between coils.

The invention claimed is:

1. A method of manufacturing a rotary electric machine including a stator and a rotor arranged in face-to-face relation to said stator via an air gap, said stator including a connected core, a plurality of coils, and a crossover wire, the method of manufacturing the rotary electric machine comprising:

forming said connected core from a plurality of cores in which a first core and a second core adjacent to said first core are paired to connect in a belt shape to be rounded into a substantially cylindrical shape by being folded at a core connecting portion so as to surround said rotor;

forming said plurality of coils in which a first coil whose coil wire is wound around said first core via a coil bobbin and a second coil whose coil wire is wound around said second core via a coil bobbin;

forming said crossover wire from a coil wire which connects the winding end of said first coil to the winding start of said second coil;

forming said first coil, said second coil, and said crossover wire from a single continuous coil wire; and arranging said crossover wire to cross between the first core and the second core on the inner diameter side of the core connecting portion serving as the folding center of said plurality of cores, wherein said coil wire is wound using a hook pin having a hook portion at an end thereof and having a taper shape having a smaller diameter toward an outer end of the hook pin; and when said coil wire is completed, said hook pin is made to rotate centering on its axis to remove said core after coil winding from a winding machine.

\* \* \* \* \*